(12) United States Patent
Saenz et al.

(10) Patent No.: US 9,829,898 B2
(45) Date of Patent: **\*Nov. 28, 2017**

(54) CONTROLLING CARGO PARAMETERS IN A MICROENVIRONMENT OF A REEFER DURING TRANSIT

(71) Applicants: Jorge Saenz, Weston, FL (US); Patrick E. Brecht, Petaluma, CA (US)

(72) Inventors: Jorge Saenz, Weston, FL (US); Patrick E. Brecht, Petaluma, CA (US)

( * ) Notice: Subject to any disclaimer, the term of this patent is extended or adjusted under 35 U.S.C. 154(b) by 186 days.

This patent is subject to a terminal disclaimer.

(21) Appl. No.: 13/644,963

(22) Filed: Oct. 4, 2012

(65) Prior Publication Data
US 2013/0271290 A1    Oct. 17, 2013

Related U.S. Application Data

(63) Continuation-in-part of application No. 11/205,498, filed on Aug. 17, 2005, now Pat. No. 8,461,958.

(51) Int. Cl.
G05D 27/02    (2006.01)
H04L 29/08    (2006.01)
F25D 29/00    (2006.01)

(52) U.S. Cl.
CPC .......... G05D 27/02 (2013.01); F25D 29/003 (2013.01); H04L 67/12 (2013.01)

(58) Field of Classification Search
CPC ........ G05D 27/02; H04L 67/12; G06Q 10/08; F25D 29/00
USPC ............. 340/870.07, 870.01, 870.16, 870.17
See application file for complete search history.

(56) References Cited

U.S. PATENT DOCUMENTS

| | | | |
|---|---|---|---|
| 6,679,071 B1 * | 1/2004 | Storey et al. | 62/126 |
| 6,862,499 B1 * | 3/2005 | Cretella et al. | 700/299 |
| 2004/0020236 A1 * | 2/2004 | Vince et al. | 62/434 |
| 2010/0332407 A1 * | 12/2010 | Grieve | G06Q 10/0832 705/332 |

* cited by examiner

*Primary Examiner* — Yong Hang Jiang

(57) ABSTRACT

The present invention provides, in at least one embodiment, a module device, system, and method for controlling or modifying a cargo's microenvironment in a reefer during transit. The system remotely gathers, controls and modifies reefer parameters during transit. Additionally, the system remotely gathers, controls and modifies cargo parameters in a microenvironment surrounding or within the cargo.

13 Claims, 5 Drawing Sheets

| Example # | Reefer parameter (°F) | Cargo parameter1 (°F) | Cargo parameter2 (°F) |
|---|---|---|---|
| 1 | 50 | 55 | 60 |
| 2 | 60 | 60 | 70 |
| 3 | 70 | 65 | 80 |

CONTROLLING CARGO PARAMETERS IN A MICROENVIRONMENT OF A REEFER DURING TRANSIT

CROSS REFERENCE TO RELATED APPLICATIONS

This continuation-in-part application claims the benefit of U.S. patent application Ser. No. 11/205,498, filed Aug. 17, 2005, and entitled "System for monitoring and control of transport containers," the disclosure of which is hereby incorporated by reference in its entirety.

BACKGROUND OF THE INVENTION

1. Field of Invention

The invention relates generally to controlling parameters within a shipping container and more particularly, to a device (also known as a "unit" or a "module device"), system, and method for controlling cargo (also referred to as "freight") parameters in a microenvironment of a shipping container during transit.

2. Description of Related Art

A shipping container is a container with strength suitable to withstand shipment, storage, and handling. One type of shipping container in the transportation of cargo is called a reefer. The cargo in reefers could be any type of cargo requiring climate control and/or protection from "hot" or "cold" conditions. A reefer is a term of art that means a refrigeration unit married to an insulated box for the carriage of cargo such as a refrigerated container, refrigerated trailer, refrigerated boxcar, refrigerated air cargo container, refrigerated truck, etc. The refrigeration unit controls the temperature of the conditioned air either delivered to and/or returning from the cargo space. Controlling is the sensing and transmitting of the temperature and other conditions to the reefer unit's microprocessor for the regulation of the conditioned air either delivered to and/or returning from the cargo space.

An advantage of using a multimodal reefer to ship cargo is that the reefer does not require any handling of the cargo itself when changing modes of transportation. For example, when transferring cargo between a train, a ship, a truck, and/or an aircraft, the reefer reduces damage and loss, allows cargo to be transported faster, and improves security.

A problem with conventional reefers is precisely controlling the temperature, humidity, oxygen, carbon dioxide, ozone and other constituents of the air and cargo in various locations within (e.g., inside) the cargo space during transit.

U.S. Pat. No. 6,862,499 issued to Cretella et al. is directed to regulating the conditioned space of an environment-controlled transport unit by identifying the product being conveyed as cargo in the conditioned space of a transport unit. A user can identify the type of cargo by selecting it from a menu of cargo identifiers. Once the type of cargo is identified, an environment control system retrieves from memory environment-control parameters as a function of the identified cargo, and regulates the environment of the conditioned space based upon the environment-control parameters. A remote database provides a control unit with data concerning various products and their associated environment control parameters. One or more sensors located inside the refrigeration unit provide information to the control unit about the environmental conditions either returning from ("return air") and/or entering ("supply air") into the cargo space, such as temperature and humidity. The control unit regulates the conditioned air supplied to cargo space by selecting the type of cargo and retrieving cargo controlling parameters from the remote database without external input. The control unit does not regulate microenvironments within the cargo space.

U.S. Pat. No. 6,679,071 issued to Storey et al. is directed to a temperature responsive refrigerated transport container having a self-contained refrigeration plant in which a short range radio transmits a sensed temperature to a remote operator panel using an identity code with the panel controlling the plant via a radio transmitter using an operating signal generated at the panel. A communications interface remotely monitors and/or controls the refrigeration container operating conditions. Monitoring is the sensing and recordation of conditioned air. The controlling and monitoring of the refrigeration transport container may be carried out from a remote central bureau.

However, each of these conventional reefer devices falls short because they do not allow users to measure reefer parameters, or cargo parameters, during transit. For example, these conventional devices do not establish communication throughout the entire time in transport from origin to destination and do not control the condition of the cargo itself.

SUMMARY OF THE INVENTION

The present invention provides, in at least one embodiment, a module device, system, and method for controlling a cargo's microenvironment(s) ("locations") within the cargo space of a reefer during transit.

In one embodiment, a microenvironment of the environment may be a very small, specific area, distinguished from other microenvironments and potentially influenced differently by its immediate surroundings such as the placement and stacking of the manifest cargo within the truck/trailer/container, air infiltration into the truck/trailer/container, the airflow and temperature stratification in the load and other factors as well as the amount of radiant heat load of the sun, road heat, humidity, rate of speed of the transit vehicle and/or diurnal temperatures. More specifically, a microenvironment may be the environment immediately within or surrounding a perishable item, package, carton, cargo, etc. in a localized area inside a macroenvironment. The environment of the interior of a reefer or an insulated box may constitute a macroenvironment.

The microenvironment has its own temperature, humidity, gaseous and particulate composition of the cargo and the air. Although the microenvironment and the macroenvironment may be linked by ventilation and heat transfer between the two environments, the environment in the microenvironment can be and generally could be quite different from the environment in the macroenvironment (e.g., the interior of a reefer or insulated box) and may be affected by the characteristics of both environments. Controlling and modifying the characteristics of the microenvironments may be critical, in part, to maximizing the shelf life of the cargo and, in the case of perishable foods, optimizing the wholesomeness and quality of the food. Moreover, microenvironmental conditions may induce changes in metabolic and physiologic processes or alterations in disease susceptibility and condition of the perishable items.

The system remotely gathers microenvironment data regarding the cargo and remotely modifies the microenvironment surrounding or within the cargo through the reefer's integral refrigeration unit. Modifying is changing somewhat the form or qualities of the cargo and/or the conditioned air inside the reefer.

There are three main features that distinguish this invention from prior art. First, the system controls a cargo's microenvironment(s) (i.e., specific locations) within the cargo space of a reefer during transit. Second, a remote user can remotely couple the monitoring the parameters in the microenvironments within the cargo space of the reefer with the ability to modify and/or control these parameters or processes using these parameters. Third, the condition of the cargo and the expected remaining shelf life of the cargo can be established and/or validated by coupling monitoring with controlling and/or modifying of the critical cargo parameters.

In one embodiment, a system comprises: a sensor coupled to cargo in a reefer having a reefer parameter, wherein the sensor measures a cargo parameter during transit, wherein the sensor and the cargo parameter are located in a microenvironment surrounding or within the cargo; a module device coupled to the sensor, wherein the module device is configured to receive the cargo parameter during transit; and a remote device coupled to the module device, wherein the module device is configured to modify or control the reefer parameter during transit based on the cargo parameter. The sensor may comprise at least one of a temperature monitor, an atmosphere monitor, and/or cargo condition monitor. The cargo may require climate control and/or the cargo may comprise pharmaceuticals, temperature sensitive dry goods or perishable commodities. The remote device may comprise a smartphone or a computer. The remote device may be wirelessly coupled to the module device. The module device may be wirelessly coupled to the sensor. The reefer may comprise a reefer container, a reefer boxcar, a reefer trailer, a reefer truck, or an air cargo container.

In another embodiment, a module device comprises: a receiver coupled to a sensor in a reefer having a reefer parameter, wherein the sensor measures a cargo parameter during transit, wherein the sensor and the cargo parameter are located in a microenvironment surrounding or within the cargo; and a transmitter coupled to a remote device, wherein the remote device is configured to receive the cargo parameter during transit; and an interface coupled to a reefer controller, wherein the reefer controller is configured to modify or control the reefer parameter during transit based on the cargo parameter.

In a further embodiment, a method comprises the steps of: measuring a cargo parameter of cargo during transit using a sensor in a microenvironment surrounding or within the cargo; transmitting the cargo parameter during transit to a remote device; and modifying the cargo parameter during transit using a module device.

An advantage of the present invention is that reefer parameters can be modified and/or controlled within microenvironments within the cargo space during transit. A remote user can remotely monitor the parameters in the cargo space of the reefer with the ability to modify and/or control these parameters if needed (e.g., gathering temperature, humidity, oxygen, carbon dioxide, ozone and other constituents).

Another advantage of the present invention is that the parameters in the reefer can be modified and controlled more precisely. By monitoring the cargo parameters, which are the parameters in a microenvironment within the cargo space, as opposed to monitoring the reefer parameters inside the refrigeration unit, a remote user can more precisely modify and/or control the cargo parameters. Having a commodity at the right temperature is critical. It maximizes the shelf life of the commodity and, in the case of perishable foods, it optimizes the wholesomeness and quality. Additionally, coupling monitoring with controlling and/or modifying the cargo parameters helps project the condition of the cargo and the expected remaining shelf life by validating critical factors such as temperature, humidity, oxygen, carbon dioxide, ethylene, sulfur dioxide, trace volatiles and the like. Condition is a term of art that relates to the state of the perishable foods with regard to its appearance, quality, or defects that change over time after harvest.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, and the advantages thereof, reference is now made to the ensuing descriptions taken in connection with the accompanying drawings briefly described as follows.

DETAILED DESCRIPTION OF EMBODIMENTS

Figure 1:
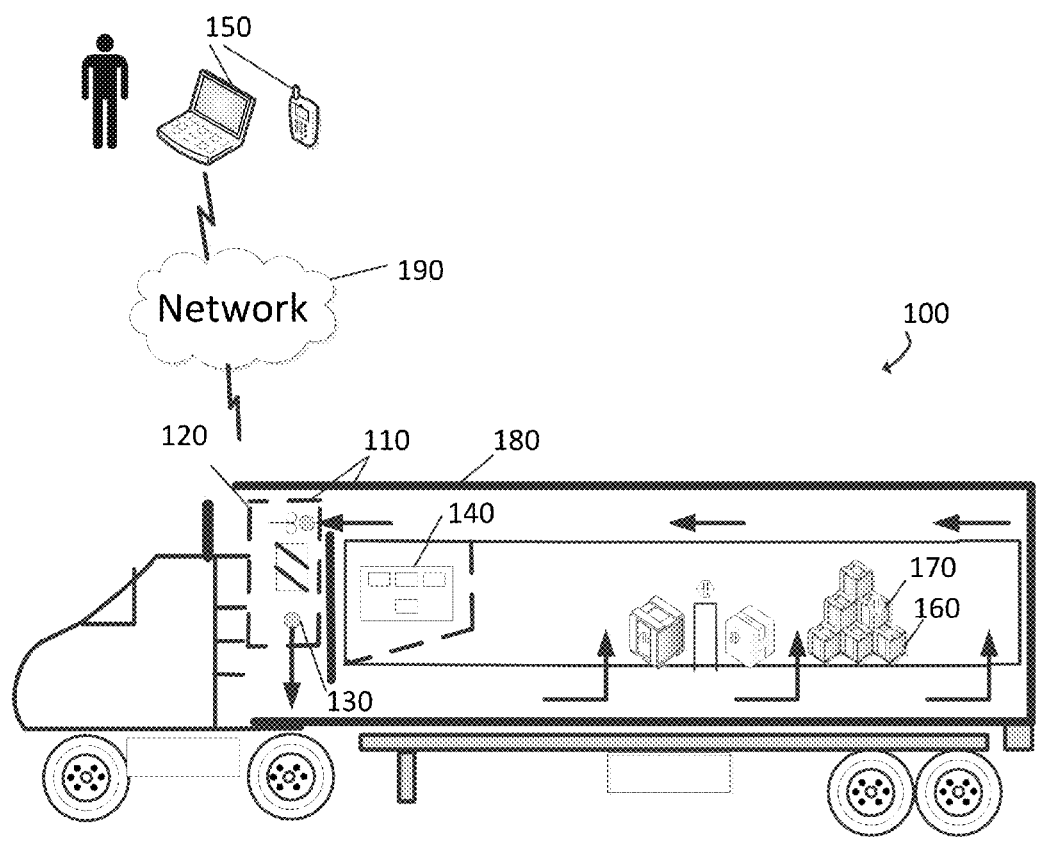
FIG. 1 illustrates a cargo parameter control system according to an embodiment of the invention.

Further features and advantages of the invention, as well as the structure and operation of various embodiments of the invention, are described in detail below with reference to the accompanying FIGS. 1-7, wherein like reference numerals refer to like elements. Although the invention is illustrated and described in the context of a multimodal refrigerated container for land and sea shipments, other types of shipments may be used such as, but not limited to refrigerated boxcars, truck trailers, bobtails, and air cargo containers.

The present invention provides, in at least one embodiment, coupling remote monitoring and controlling of microenvironments within the cargo space using portable temperature and atmosphere monitors. One embodiment of the invention includes remotely controlling, monitoring and modifying of a cargo condition during transit. Another embodiment of the invention includes remotely controlling, monitoring and modifying of a cargo condition in a microenvironment within the cargo space.

FIG. 1 illustrates a cargo parameter control system 100 according to an embodiment of the invention. The system 100 comprises a reefer 110, a refrigeration unit 120 having one or more conventional refrigeration unit sensors 130, a monitoring and controlling module device 140 that accompanies the reefer 110, an external remote monitoring and controlling device ("remote device") 150 located outside the reefer, cargo 160 having at least one sensor 170, an insulated box 180, and a network 190.

The system 100 controls a cargo's microenvironment inside the reefer's insulated box 180 during transit. The system 100 solves an industry problem, in that it eliminates the lack of visibility of cargo conditions (e.g., the inability to control, monitor, and modify temperature, humidity, oxygen, carbon dioxide, ozone and other constituents) within various locations in the cargo space, during transportation. Also, the system 100 provides the opportunity to minimize cargo losses due to failures in the transport unit's environmental-controlled system. For example, the failures occur due to the inability to monitor cargo conditions during transit. The system 100 accomplishes this by enabling remote monitoring and controlling of cargo conditions by the module device 140 that accompanies the reefer and communicates with an external remote device 150. The system 100 may use a local transceiver, a cellular transceiver, and a GPS.

Unlike conventional reefers, the system 100 can couple the measurement of cargo conditions ("parameters") in microenvironments within the cargo space of the reefer's sealed insulated box 180 with modification and/or control of these conditions. Different microenvironments within the same cargo space may have different parameters, meaning the parameters may not be uniform across the reefer 110. Portable monitors ("recorders") and/or sensors in use today do not facilitate the modification or control of the microenvironments within the insulated box 180. The portable recorders in use today must be removed from the cargo space during devanning (offloading) in order to review the recorded information.

Conventional systems do not facilitate the modification or control of the microenvironments within the insulated box 180; conventional systems do not establish communications with more than one type of network, conventional systems do not establish communication throughout the entire transport time from origin to destination, and conventional systems do not control the condition of the cargo itself.

Further, unlike conventional reefers, the system 100 takes into account that the reefer parameters may vary widely throughout the reefer 110. For example, the temperatures in different locations in a load of cargo within the insulated box 180 are routinely different. Conventional reefer sensors do not modify and/or control the microenvironments in the container's cargo space ("compartment"). Recorded air temperatures and other environmental factors that are monitored and controlled at the microenvironment sensors 170 located inside the refrigeration unit 120 are typically not the same as the cargo and air temperatures inside the cargo space (e.g., at conventional sensor 130) in truck trailer or container. Differences in temperature and other conditions inside the insulated box 180 can be due to the distance of the microenvironment from the refrigeration unit 120, the placement and stacking of the manifest cargo within the truck, trailer, container and/or boxcar, air infiltration into insulated box 180, airflow and temperature stratification in the load within the insulated box and other factors.

The nature of a reefer is that a temperature differential exists between the air entering the reefer unit (i.e., the return air), and the air exiting the unit (i.e., the discharge or supply air). This temperature differential is distributed within the reefer and results in the cargo and air inside the cargo compartment being exposed to a range of temperatures. The recorded air temperatures and other environmental factors that are monitored and controlled inside the reefer unit are typically not the same as the cargo and air temperatures inside the truck trailer (or container). To with, the placement and stacking of the manifest cargo within the truck/trailer/container, air infiltration into the truck/trailer/container, airflow and temperature stratification in the load and other factors, all affect the temperature and other environmental factors inside the microenvironments in the reefer.

The reefer 110 is a refrigerated shipping container for transporting cargo. One of ordinary skill in the art readily appreciates reefers and their operation. Reefers go by many other names, such as a refrigerated transport container, a reefer box, a reefer boxcar, a reefer container, a reefer trailer, an environmental controlled container, an environmental controlled air container, an environmental controlled boxcar, an environmental controlled trailer, etc.

The refrigeration unit 120 is integral component of the reefer 110 that is attached to the insulated box 180. The refrigeration unit 120 controls the temperature and other components of the conditioned air delivered to the cargo space. The refrigeration unit 120 features controlling and monitoring sensors 130 (e.g., refrigeration unit's conventional sensors) which are typically located within the refrigeration unit assembly 120 and not within the insulated box 180.

The refrigeration unit's conventional sensors 130 located within the refrigeration unit 120 measures and control the temperature and other components of the conditioned air supplied to the insulated box's cargo space and/or returning from the cargo space. In addition to temperature, the reefer parameters may include humidity, ozone, oxygen and carbon dioxide.

The module device 140 communicates with a remote device 150 that allows reefer parameters, such as temperature, to be measured during transit. The module device 140 wirelessly communicates these parameters from the reefer 110 to the remote device 150. Further, the module device 140 communicates with the refrigeration unit 120 to modify the parameters. The module device 140 is further described in FIG. 4.

The remote device 150 gives a user the ability to control the parameters within the reefer. The remote device 150 can be mobile (e.g., smartphone, PDA, tablet computer, laptop computer), can be stationary (e.g., desktop computer, server, kiosk), or can be cloud computing services, i.e., the use of computing resources (hardware and software) that are delivered as a service over a network (typically the Internet).

The remote device 150 could be a handheld or mobile device, a desktop or stationary computer, or a remote server or cloud computing resources ("cloud") that could be programmed to store, sort, aggregate, analyze, and transform data to create events, create and process notifications, and automated responses. This communication is enabled by the local wireless transceiver, a cellular radio, and the external connectivity to a stand-alone satellite communications device.

Therefore, by enabling these personal area networks, wireless local area networks, and wide area networks (PAN, WLAN, WAN) during transit, the ability to monitoring, controlling, and modifying parameters within microenvironments or cargo space area is never lost. In one embodiment, the remote device 150 is a smartphone. In another embodiment, the remote device 150 is a laptop or desktop computer. The remote device 150 communicates with the module device 140, which also communicates with the refrigeration unit 120. The refrigeration unit 120 modifies the reefer parameters, which modify the cargo parameters. For example, the refrigeration unit 120 modifies the reefer parameters such as the temperature, humidity, oxygen, carbon dioxide, ozone and other constituents. The user has control of the reefer parameters in transit, because the user can couple monitoring with controlling and/or modifying of those parameters programmed on the remote device 150.

The cargo 160 is contained within the insulated box 180 of the reefer 110. The cargo 160 is known by one with skill in the art. The cargo 160 can also be referred to as freight, commodities, or perishable products. In one embodiment, the cargo 160 is a perishable commodity such as fruit. In another embodiment, the cargo is a pharmaceutical such as a tuberculosis vaccine The sensors 170 (e.g., microenvironment sensors) are located in the microenvironment of the cargo 160. One of ordinary skill in the art can enable the hardware and software of sensors to transmit data. The sensors 170 measure cargo parameters (e.g., temperature of the cargo within the microenvironment). In addition to temperature, the cargo parameters include humidity, oxygen, carbon dioxide, ozone, ethylene, trace volatiles, sulfur dioxide and the responses to modified levels of those components which may differ at temperatures other than the optimum for a particular commodity, and which may also differ for different maturities or ripeness stages, varieties, growing regions, growing conditions and seasons. The sensors 170 can be placed in several locations within the microenvironment. For example, the sensor 170 can be inserted inside the pulp (also known as "core") of banana, located on the skin of a banana, within a box of bananas, on the exterior of a box of bananas and different locations inside of a pallet containing boxes of bananas. The sensors 170 can be placed throughout the reefer 110. In one embodiment, the sensors 170 are placed inside every pallet stowed within the insulated box 180. In another embodiment, the sensors 170 are placed on each corner and in the ceiling and floor of the insulated box 180.

The network 190 connects the module device 140 with the remote device 150. The network 190 includes a personal area network (PAN), a wireless local area network (WLAN), and a wide area network (WAN).

The PAN can connect the module device 140 and remote device 150 (e.g., smartphone paired with a reefer's module device 140 using Bluetooth communications). The WLAN can connect the module device 140 accompanying a given number of reefers and the remote device 150 (e.g., fifty reefers in a container yard and a desktop computer monitoring and controlling the conditions in the reefers). The WAN can connect the module device 140 and the remote device 150 (e.g., smartphone monitoring and controlling reefer's parameters using cellular communications network, a desktop computer monitoring and controlling reefer's parameters using satellite communications network; whereas satellite communications network is provided by land-based satellite station connected via internet to desktop computer).

In one embodiment, a microenvironment of the environment is a very small, specific area, distinguished from other microenvironments and potentially influenced differently by its immediate outside ambient surroundings such as the amount of radiant heat load of the sun, road heat, humidity, rate of speed of the transit vehicle and/or diurnal temperatures. For example, the side of a tree that is shaded from sunlight is a microenvironment that typically supports a somewhat different community of living organisms than is found on the side that receives regular light.

Microenvironments may be created by the variability in temperature and/or atmospheric distribution inside the cargo space of the refrigerated transport container due to many factors, such as but not limited to: leak rate, thermal efficiency, age and condition of the refrigerated transport container, insufficient unitization, packaging and stowage of cargo, short cycling of condition air, product's field heat and heat of respiration, and condition, age and/or maturity of cargo.

Figure 2:
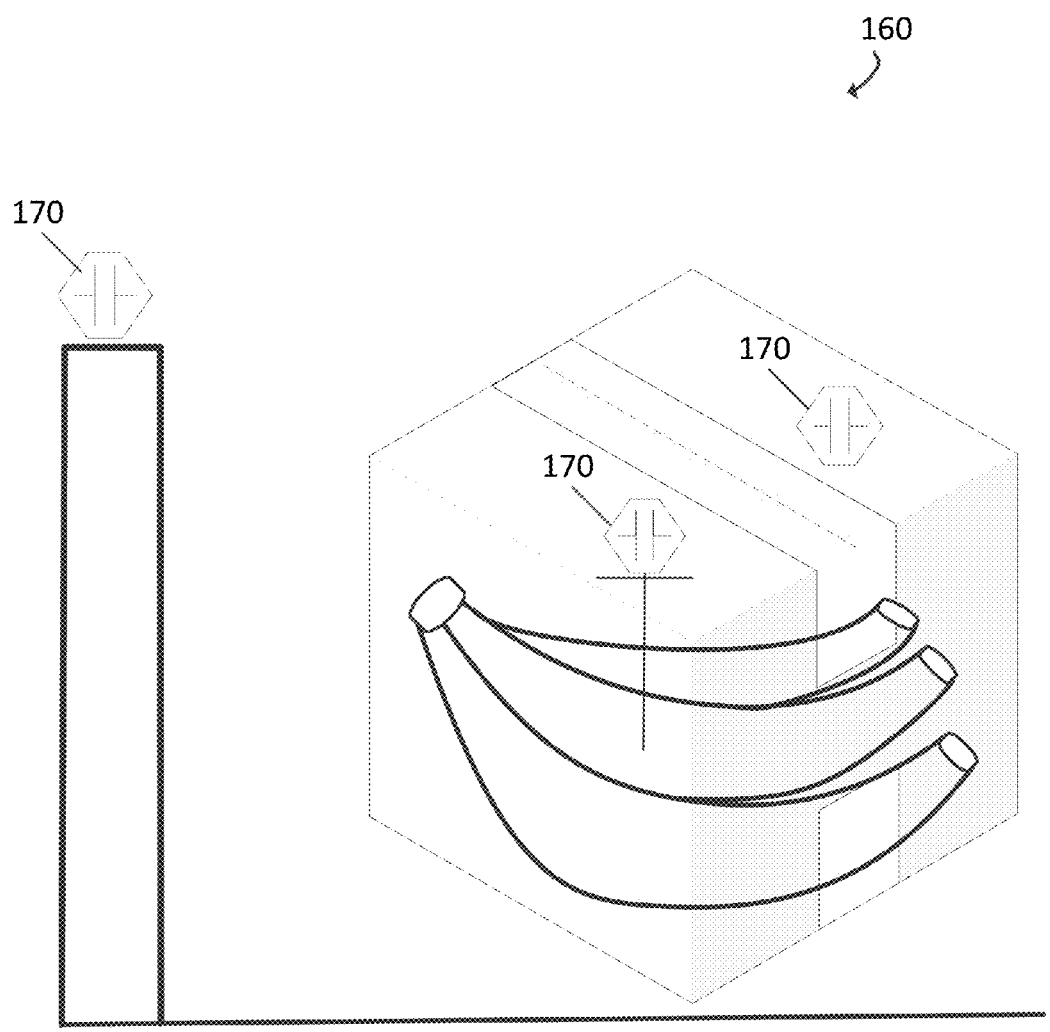
FIG. 2 illustrates cargo having microenvironment sensors in the system according to an embodiment of the invention.

FIG. 2 illustrates cargo 160 having microenvironment sensors 170 in the system 100 according to an embodiment of the invention. The cargo 160 illustrates a box of bananas. For instance, the cargo includes the bananas, the packaging, the cartons (boxes), the pallets, and the dunnage. The sensors 170 measure cargo parameters and communicate these parameters to the module device 140. In one embodiment, the sensors 170 are placed near the cargo 160. In another embodiment, the sensor 160 is placed on the box of the cargo 160. In a further embodiment, the sensor 160 is placed on or in the cargo 160.

Figures 3, 4:
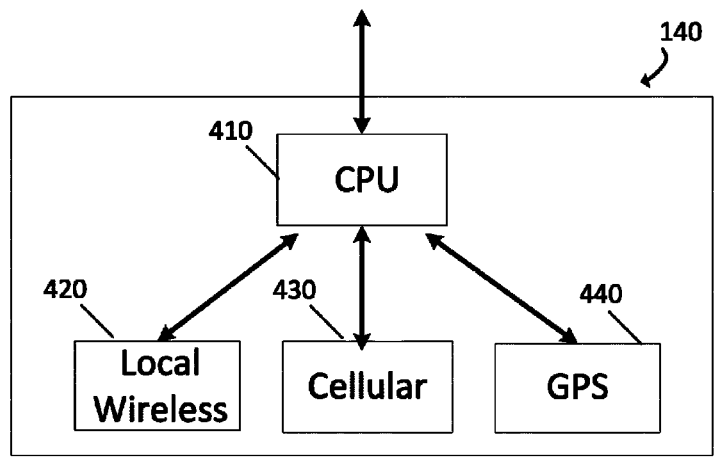
FIG. 3 illustrates a chart of the system according to an embodiment of the invention.
FIG. 4 illustrates a module device of the system according to an embodiment of the invention.

FIG. 3 illustrates a chart 300 of the system 100 according to an embodiment of the invention. The chart 300 illustrates three examples where the reefer parameters are not the same as the cargo parameters. A main reason for the differences is the location of the measurement. The reefer parameters are typically measured near the refrigeration unit 120, whereas the cargo parameters are measured in the microenvironment of the cargo 160. There are many reasons why the microenvironment sensor locations are important, including but not limited to: poor stowage, cargo loaded too hot or too cold, respiratory heat produced from the cargo, inadequate airflow, reefer machinery breakdown, insufficient reefer capacity, poor carton venting, type of packaging, inadequate box insulation and/or voids in insulated box's insulation, outside ambient conditions (e.g., excessively hot or cold), etc.

In the first example, the reefer unit parameter (e.g., supply air), measured at the conventional sensor 130, is 50 degrees Fahrenheit, whereas the two cargo parameters measured at the microenvironment sensors 170, are 55 and 60 degrees, respectfully. In the second example, the reefer unit parameter measured at conventional sensor 130 is 60 degrees Fahrenheit, whereas the two cargo parameters measured at microenvironment sensors 170 are 60 and 70 degrees, respectfully. In the third example, the reefer parameter at the conventional sensor 170 is 70 degrees Fahrenheit, whereas the two cargo parameters measured at the microenvironment sensors 170 are 65 and 80 degrees respectfully.

FIG. 4 illustrates the module device 140 of the system 100 according to an embodiment of the invention. The module device 140 includes a microprocessor or CPU 410 that communicates with a local wireless transceiver 420, a cellular transceiver 430, and a GPS receiver 440. The module device 140 is typically connected to the reefer's conditioning unit controller via a port or interface. The components of the module device 140 are described further in reference to U.S. patent application Ser. No. 11/205,498, the disclosure of which is hereby incorporated by reference in its entirety.

The module device 140 may additionally include sensors installed inside and/or outside the reefer 110 and intended for recording of parameters characterizing the conditions of storage of cargo, operation mode of reefer equipment, external ambient parameters, state of container, and so forth. The module device 140 may also include a satellite communication modem or a programmable port or interface to communicate with a satellite communications transceiver. The module device 140 can be put in any location of the container. The module device 140 provides information on its location, conditions of cargo storage, and the state of the cargo, state of reefer, and the remote control of reefer equipment.

The microprocessor or CPU 410 provides centralized control over different means of communication—namely, over the local wireless transceiver 420, the cellular transceiver 430, and the GPS receiver 440. The microprocessor or CPU 410 may also provide control over a satellite communication transceiver. The microprocessor or CPU 410 may detect the available type of communication such as local wireless communication occurring via an 802.11 (Wi-Fi) and/or an 802.15 (Bluetooth) and/or ZigBee LAN, which can be set up on a vehicle or a ship. The condition-controlling communication device or remote device 150 can be a smartphone, a tablet, a computer or any remote device which can bi-directionally communicate with the module device 140 directly or via the communication gateway. For example, the remote device 150 could be a PDA, a remote smartphone, a tablet, or any other device as a certain application can call for.

The local wireless transceiver 420 allows for sending and receiving local wireless information. The local wireless transceiver 420 includes a transceiver and an antenna unit. The local wireless transceiver can be Bluetooth, or Wi-Fi, or ZigBee. The local wireless transceiver 420 is described further in reference to U.S. patent application Ser. No. 11/205,498, the disclosure of which is hereby incorporated by reference in its entirety.

The cellular transceiver 430 allows for sending and receiving of wireless cellular communication. The cellular transceiver 430 includes a cellular radio, an antenna unit, and at least one slot for SIM-card installation. The cellular transceiver 430 is described further in reference to U.S. patent application Ser. No. 11/205,498, the disclosure of which is hereby incorporated by reference in its entirety.

The GPS transceiver 440 includes a receiver and antenna unit. GPS allows many more features, such as displaying the exact location of the transport unit on a map; knowing the exact location of the reefer when an event condition occurred (e.g., failure to maintain cargo temperature, failure to communicate with controller, failure to connect with communications network, etc.); knowing the exact location of the reefer when an event condition occurred to determine proper action steps to correct condition; knowing the exact location of the reefer when an event condition occurred to notify appropriate parties, such as: cargo management personnel on board vessel, cargo management personnel at arrival port, cargo owner, cargo consignee, etc.; determining if a reefer is at a scheduled location or not (e.g., on board vessel, at the port, in-transit); determining if a reefer is at a scheduled location at the expected time; determining the exact location of a transport unit within a transport unit distribution yard (i.e. container yard); determining if a reefer is leaving a specific location and needs to switch to a different communications network (i.e., geo-fencing); determining if an external device being powered by module device 140 needs to be on-off position (e.g., light strobe).

For example, in the case of a refrigerated container or trailer transported by a transcontinental over-the-road tractor or rail system, the operation of the system is provided for by all three types of means of communication of the device. The location of a container is determined by a GPS-receiver. The container's coordinates, as well as the data on temperature in the container and other parameters of the cargo compartment are transmitted using a transceiver of cellular communication to the cellular communication network and further to the Internet to which a remote central station or another remote computer is connected. An operator or automated system of monitoring and control receives the data and gives the appropriate commands to control the operation of equipment or change the conditions in the container to the unit in that container. These commands are first received by cellular communication transceiver via Internet and further, via cellular communication network, and then processed by the microprocessor or CPU of module device 140, which then generates the appropriate control signals for the reefer's conditioning unit's controller.

The module device 140 may include a microprocessor, RF transmitters (e.g., cellular, Bluetooth, ZigBee, Wi-Fi, Wi-Max) and antennae, GPS receiver and antenna, sensors for cargo and cargo area, power supply to other devices (e.g., starters, contactors, light generation, audio generation). The module device 140 can have wired or wireless connections with a refrigeration unit's controller. The controller can control the operation of environmental conditions, such as: refrigeration, humidification, atmosphere condition, lighting, etc. The module device 140 can have wired connections with a RF transmitter for satellite communication and an RF transmitter for cellular communications network to create WAN ("Wide Area Network"). The module device 140 can have wireless connections with a remote communications networking device (e.g., router) to create a WLAN ("Wireless Local Area Network") and with a remote wireless communications device (e.g., smartphone or PDA or Tablet) to create a PAN ("Personal Area Network"). Wireless connectivity allows remote monitoring and controlling of one or many reefers at the same time, which have been registered and identified in the system. Wireless connectivity is also used in combination with GPS or with system's software to determining if a reefer is located at its scheduled place (e.g., right location on board the ship). The wireless connection with GPS satellite system determines the location of reefer while in-transit. This allows the module device 140 to aid in prioritizing internal selection of communication network within geographic location for establishing network availability. This also allows the module device 140 to select a communication networks within geographic location already programmed in the system/device.

Figure 5:
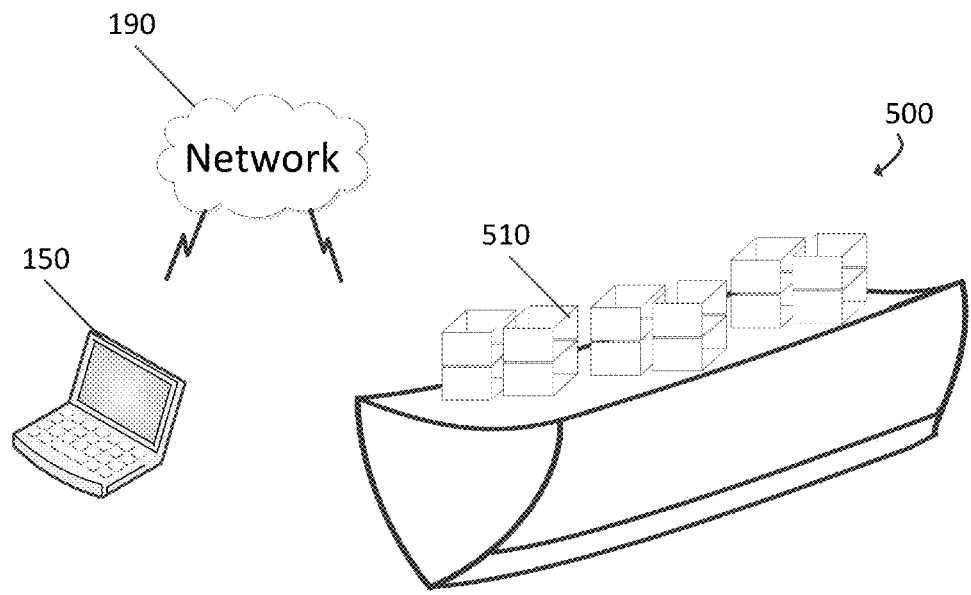
FIGS. 5-6 illustrate shipping and plane systems according to embodiments of the invention.
Figure 6:
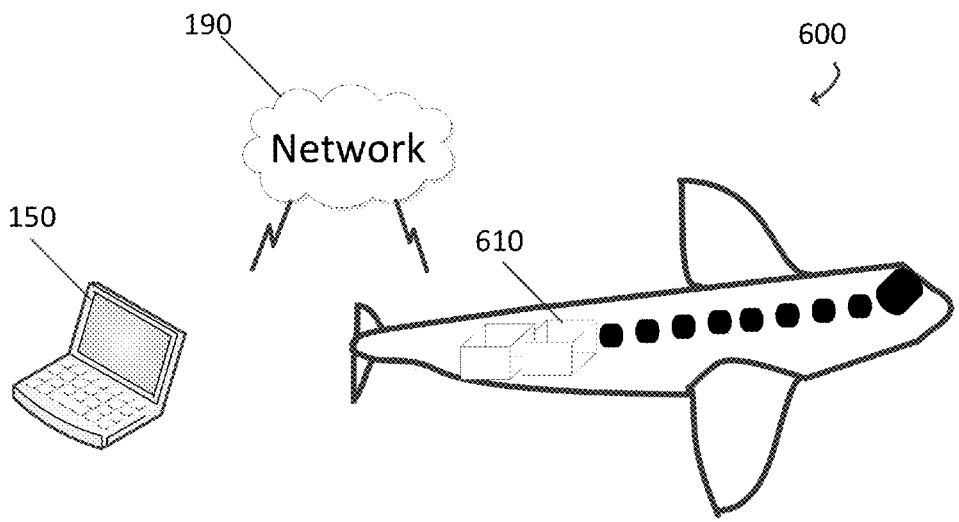

FIGS. 5-6 illustrate marine and air cargo transport systems 500, 600 according to embodiments of the invention. Similar to the system 100, the systems 500, 600 control a cargo's microenvironment in the reefers 510, 610 during transit. The reefers 510, 610 communicate with the remote device 150 through the network 190. For example, the reefer 510 communicates with cargo and reefer parameters from the vessel to the remote device 150. The remote device 150 modifies the reefer parameters which change the cargo parameters.

When a container is transported by a vessel, the system 500 enables remote monitoring of parameters in the reefer's microenvironments by providing communications between the remote device 150 and a module device 140 by means of satellite communication. The remote device 150 may use a wireless local network and the Internet to send and receive data through a satellite network land station. A local wireless or wired network, with access points located in close vicinity to the reefers on the vessel and a local computer connected via port or interface to a satellite transceiver on the vessel are also provided. Once data is received by the local computer through the satellite transceiver on the vessel, the data is sent to a module device 140 through the local wireless and/or wired network for monitoring and controlling parameters. While on the vessel, the geographical position of a reefer coincides with the location of a vessel, which is determined by its navigational system. This geographical position is transmitted to the remote device 150 using the same method described above.

A local computer on the vessel provides monitoring and control of the parameters in microenvironments of the cargo space over a local wireless and/or wired local area network. A mobile device on the vessel such as a smartphone, a PDA, or a tablet computer provides monitoring and control of the parameters in microenvironments of the cargo space over a local wireless and/or wired or a personal area network. The vessel's stowage plan and the local wireless and/or wired network on the vessel can be used to determine the exact position of the reefer on the vessel, which is displayed either on the local computer on the vessel or on a remote device 150 on the vessel.

Figure 7:
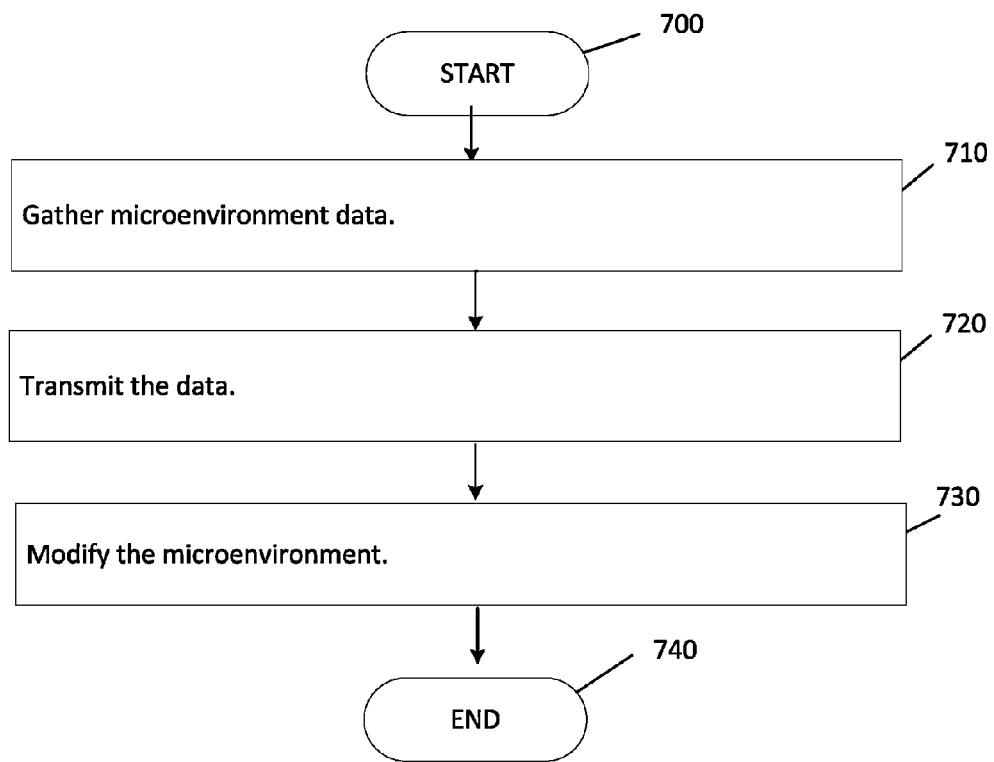
FIG. 7 illustrates the process of controlling a cargo's microenvironment in a reefer during transit according to an embodiment of the invention.

FIG. 7 illustrates the process of controlling a cargo's microenvironment in a reefer during transit according to an embodiment of the invention. The process starts at step 700. At step 710, the module device 140 gathers microenvironment data. This data includes the cargo parameters (e.g., temperature) from the sensors 170 located in the microenvironment surrounding the cargo 160. Then, at step 720, the module device 140 transmits the data to the remote device 150. At step 730, the module device 140 modifies the microenvironment. The modification can be based on input received from the remote device 150 and transmitted through the module device 140 and to the refrigeration unit 120. The refrigeration unit 120 changes the reefer parameters which in turn changes the cargo parameters. The process may be repeated recursively a number of times and ends at step 750.

It is to be recognized that depending on the embodiment, certain acts or events of any of the methods described herein can be performed in a different sequence, may be added, merged, or left out altogether (for example, not all described acts or events are necessary for the practice of the method). Moreover, in certain embodiments, acts or events may be performed concurrently, for example, through multi-threaded processing, interrupt processing, or multiple processors, rather than sequentially.

The system 100 integrates with a GPS receiver and uses its data to feed the embedded network switchover software to optimize the availability and selection of communication networks. It also combines a GPS location with cargo conditions to establish specific control parameters.

The system 100 also integrates its own cargo sensors (i.e., sensors affixed to actual product, case or carton of product, and/or pallet of product being transported) for cargo space condition monitoring and cargo condition monitoring.

The system 100 can determine failures in the environmentally-controlled transport unit that may affect the condition of the cargo by continuously remotely monitoring and controlling. Further, the system 100 can take corrective actions via the condition-controlling communication remote device 150 (e.g., computer, hand-held, etc.).

The system 100 addresses many existing problems. For example, the system 100 addresses a lack of visibility of controlled conditions in a refrigerated cargo container during distribution from source to market. The system 100 also addresses the inability to acknowledge a failure of the environment-adjusting system during transit. Additionally, the system 100 addresses a lack of knowledge of actual cargo controlled parameters during transit after the initial cargo controlled parameters have been established based on the identification of cargo type. The system 100 addresses the difficulties and dangers of physically monitoring and controlling temperature and other cargo controlled parameters at land and on a vessel.

The system 100 provides continuous remote monitoring and controlling of environmental-control transport throughout entire transport period for detecting and correcting failures of self-controlling system, and to introduce, control parameters based on cargo conditions, location, and user's knowledge. The system 100 makes cargo conditions visible to external devices with remote access capabilities. The system 100 provides GPS data to assist, via switchover software, to establish availability and selection of communication networks.

The system 100 has remote devices that are capable of determining environmental-control parameters based on continuous cargo condition data. These devices may affect: period of monitoring (time period when remote user has an opportunity to observe the cargo's parameters); degree of monitoring (levels of details and precision of information about the cargo's parameters); period of control (time period when remote user has an opportunity to change the cargo's parameters); degree of control (number of cargo parameters that can be changed and the extent and access to each point of the cargo's space and the cargo itself).

The system 100 has many commercial applications including food safety and quality control. For example, the industry has to comply with continually evolving food safety regulations. Also, the ability to manipulate the life of a commodity during transit, by changing the cargo parameters can have significant commercial benefits.

The system 100 provides for the coupling of remote monitoring with modifying, and controlling of micro-environments inside the reefer 110. The system 100 controls various conditions of the products/cargoes being transported inside the cargo space of the refrigerated transport container.

The system 100 uses of one or multiple sensors placed in one or multiple locations for remote monitoring modifying, and/or controlling of microenvironments inside the cargo space of the refrigerated transport container. The uninterrupted (i.e., continued or extended in scope) use of sensors for remote monitoring, modifying and/or controlling of one and/or various conditions of the microenvironments and/or products during loading, following loading and/or during offloading (i.e., devanning) of the products from the cargo space of a refrigerated transport container. The sensors may continue to be attached and/or inserted into the cargo, a pallet, box, carton, case, individual package or stock-keeping-unit.

The system 100 provides remote coupling of monitoring with modifying and/or controlling of product shelf life and condition inside the cargo space of a reefer during storage and transport, such as but not limited to: spoilage, deterioration, adulteration, cross contamination, microbiological hazards to human health, organoleptic quality attributes, trace volatiles, eating quality, condition defects, diseases, disorders, aging, ripening, de-greening, quarantine treatments (e.g., insect disinfestation) such as cold treatment, and curing.

The system 100 allows for the use of multiple sensors for many purposes. For example, the use of multiple sensors for remote controlling, monitoring and/or modifying the cargo condition and/or the microenvironments within the cargo space of a refrigerated transport container created by specific packaging materials, waxes and/or chemical treatments, such as but not limited to: oxygen and carbon dioxide membranes, wax formulations, thermal covers, modified-atmosphere packaging (also known as "MAP"), sealed bags, ethylene absorbent material, and ozone generating equipment.

Also, the use of multiple sensors for remote controlling, monitoring and/or modifying the cargo condition and/or the microenvironments within the cargo space of a refrigerated transport container to measure, estimate, or predict product-specific outcomes, such as but not limited to: product's shelf life, spoilage, deterioration, adulteration, cross contamination, microbiological hazards to human health, cross contamination, microbiological hazards to human health, organoleptic quality attributes, condition defects, diseases, disorders, aging, ripening, de-greening, insect disinfestation, product's respiration rates, and stage of ripeness. Examples include: monitoring temperature pull-down time, rates of airflow, carbon dioxide, trace volatiles, and ethylene production of bananas to predict possible unwanted, premature ripening of green boxed bananas while in transit.

Further, system 100 can use multiple sensors for remote controlling, monitoring and/or modifying the cargo condition and/or the microenvironments within the cargo space of a refrigerated transport container. Additionally, the use of multiple sensors for remote controlling, monitoring and/or modifying of the cargo condition and/or the microenvironments within the cargo space of a refrigerated transport container to assess, initiate, track, trace and/or modify specific logistic activities, such as but not limited to: refrigerated transport container rerouting, reefer container reassignment, reefer container loading, reefer container storage, and reefer container maintenance.

The system 100 provides a short range wireless transceiver for many purposes. For example, the system 100 uses the unit's transceiver of short-range wireless communication to communicate with a wireless local area network available shore side and/or onboard the vessel or aircraft to facilitate the process of stowing containers on board the vessel or aircraft by detecting the container identification number as it is placed in a slot or location in the containers on board the vessel or aircraft (e.g., identifying containers being placed/stowed in the wrong location or assuring a specific container is not being missed on the vessel or aircraft).

Additionally, the system 100 connects via a port or interface with a satellite communications transceiver to send sensor and event data to a remote device(s) through a satellite network. Further, the use of the unit's transceiver of short-range wireless communications connected to a wireless or wired local network on the vessel or aircraft can be used to send sensor and event data to a local network computer available on the vessel or aircraft connected to a satellite communications device to send sensor and event data directly from the cargo space of the refrigerated transport container to remote device(s).

The system 100 provides a GPS model. The unit's global positioning module is used to establish geographic fences based on the location of the refrigerated transport container for inventory management and/or security purposes.

The system 100 provides a power supply port, switch, or activator which powers, operates and/or initiates a device and/or devices inside the cargo space of a refrigerated transport container such as but not limited to: a motion sensor, a light sensor, an RF transceiver, ethylene canister, door sensor, or valve. Further, the same power supply port, switch, and/or activator can power, operate, and/or initiate a device outside the cargo space of a refrigerated transport container such as but not limited to: a strobe light, audio speaker, or a door contact switch.

The system 100 senses the actual cargo condition, not just the environments in the cargo space and/or the microenvironments surrounding the cargo, the readings of which may be different. Further, the system 100 uses of GPS to establish the location of reefer, to select a communication network, or to determine control conditions based on location.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

What is claimed is:

1. A system for monitoring and controlling one or more conditions in a transport container, the system comprising:
   a transceiver of local wireless communication controlled by a microprocessor unit;
   a transceiver of long-range wireless communication controlled by the microprocessor unit; and means for monitoring and controlling communication by detecting availability of one or more types of communication networks based on a location of the container determined from a global positioning module, selecting one or more available types of communication networks based on the location of the container determined from the global positioning module and establishing communication with or switching over to one or more available types of communication networks between the microprocessor unit and a condition-controlling one or more remote computer means via a communication gateway;
   a plurality of sensors coupled to a plurality of cargo in a reefer having a plurality of reefer parameters, wherein the sensors measure cargo parameters during transit, wherein the sensors and the cargo parameters are located in a plurality of microenvironments, wherein the microenvironments comprise both the sensors and the cargo parameters, wherein the microenvironments comprise localized areas inside the reefer comprising an area within the cargo;
   a module device coupled to the sensors, wherein the module device is configured to receive the cargo parameters during transit; and
   a remote device coupled to the module device, wherein the module device is configured to modify or control the reefer parameters during transit based on the cargo parameters measured by the sensors during transit.

2. The system of claim 1, wherein the sensors comprise at least one of a temperature monitor, an atmosphere monitor, or cargo condition monitor.

3. The system of claim 1, wherein the cargo requires climate control or the cargo comprises pharmaceuticals, temperature sensitive dry goods or perishable commodities.

4. The system of claim 1, wherein the cargo requires climate control and the cargo comprises pharmaceuticals, temperature sensitive dry goods and perishable commodities.

5. The system of claim 1, wherein the remote device comprises a smartphone or a computer.

6. The system of claim 1, wherein the remote device is wirelessly coupled to the module device.

7. The system of claim 1, wherein the module device is wirelessly coupled to the sensors.

8. The system of claim 1, wherein the reefer comprises a reefer container, a reefer boxcar, a reefer trailer, a reefer truck, or an air cargo container.

9. A module device for monitoring and controlling one or more conditions in a transport container, the module device comprising:
   a transceiver of local wireless communication controlled by a microprocessor unit;
   a transceiver of long-range wireless communication controlled by the microprocessor unit; and means for monitoring and controlling communication by detecting availability of one or more types of communication networks based on a location of the container determined from a global positioning module, selecting one or more available types of communication networks based on the location of the container determined from the global positioning module and establishing communication with or switching over to one or more available types of communication networks between the microprocessor unit and a condition-controlling one or more remote computer means via a communication gateway;

a receiver coupled to a sensor in a reefer having a reefer parameter, wherein the sensor measures a cargo parameter, wherein the sensor and the cargo parameter are located in a microenvironment surrounding or within the cargo, wherein the microenvironment comprises a specific area; and a transmitter coupled to a remote device, wherein the remote device is configured to receive the cargo parameter; and an interface coupled to a reefer controller, wherein the reefer controller is configured to modify or control the reefer parameter based on the cargo parameter measured by the sensor.

10. A method for monitoring and controlling one or more conditions in a transport container, the method comprising:

controlling a transceiver of local wireless communication by a microprocessor unit;

controlling a transceiver of long-range wireless communication by the microprocessor unit; and means for monitoring and controlling communication by detecting availability of one or more types of communication networks based on a location of the container determined from a global positioning module, selecting one or more available types of communication networks based on the location of the container determined from the global positioning module and establishing communication with or switching over to one or more available types of communication networks between the microprocessor unit and a condition-controlling one or more remote computer means via a communication gateway;

measuring a cargo parameter of cargo using a sensor in a microenvironment surrounding or within the cargo, wherein the microenvironment comprises air with a temperature, humidity, or composition that is unique from a macroenvironment that surrounds the microenvironment;

transmitting the cargo parameter to a remote device; and modifying the cargo parameter measured by the sensor.

11. The device of claim 9, wherein the sensor measures the cargo parameter during transit.

12. The method of claim 10, wherein the sensor measures the cargo parameter during transit.

13. The system of claim 1, wherein the container comprises a reefer.

* * * * *